(12) United States Patent
Kim et al.

(10) Patent No.: US 9,121,864 B2
(45) Date of Patent: Sep. 1, 2015

(54) INERTIAL SENSOR

(71) Applicant: Samsung Electro-Mechanics Co., Ltd., Suwon-si (KR)

(72) Inventors: Jong Woon Kim, Suwon-si (KR); Won Kyu Jeung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 334 days.

(21) Appl. No.: 13/655,109

(22) Filed: Oct. 18, 2012

(65) Prior Publication Data

US 2013/0125652 A1   May 23, 2013

(30) Foreign Application Priority Data

Nov. 18, 2011   (KR) .......................... 10-2011-0121062

(51) Int. Cl.
  *G01P 15/09*   (2006.01)
  *G01C 19/56*   (2012.01)
  *G01P 15/08*   (2006.01)

(52) U.S. Cl.
  CPC ............... *G01P 15/09* (2013.01); *G01C 19/56* (2013.01); *G01P 2015/084* (2013.01)

(58) Field of Classification Search
  None
  See application file for complete search history.

(56) References Cited

U.S. PATENT DOCUMENTS

| | | | | |
|---|---|---|---|---|
| 5,212,988 A | * | 5/1993 | White et al. ..................... | 73/599 |
| 5,315,247 A | * | 5/1994 | Kaiser et al. .................. | 324/244 |
| 5,587,620 A | * | 12/1996 | Ruby et al. ..................... | 310/346 |
| 6,772,632 B2 | * | 8/2004 | Okada ......................... | 73/514.38 |
| 7,650,787 B2 | * | 1/2010 | Ino ............................. | 73/514.33 |
| 7,716,986 B2 | * | 5/2010 | Sung et al. ..................... | 73/584 |
| 7,845,229 B2 | * | 12/2010 | Nakatani et al. ........... | 73/514.33 |
| 2003/0193269 A1 | * | 10/2003 | Jang et al. ..................... | 310/346 |
| 2004/0014249 A1 | * | 1/2004 | Jorgenson et al. ................. | 438/5 |
| 2004/0263026 A1 | * | 12/2004 | Wang ............................. | 310/341 |
| 2008/0173092 A1 | * | 7/2008 | Hattori et al. .............. | 73/514.34 |
| 2009/0302716 A1 | * | 12/2009 | Ohara et al. .................. | 310/363 |
| 2010/0327702 A1 | * | 12/2010 | Martin et al. ................. | 310/346 |

FOREIGN PATENT DOCUMENTS

| | | |
|---|---|---|
| JP | 2011-220765 | 11/2011 |
| KR | 10-0563868 B | 3/2006 |
| KR | 10-2011-0072229 | 6/2011 |
| KR | 1020110072229 | 6/2011 |

OTHER PUBLICATIONS

Office action dated May 1, 2013 from corresponding Korean Patent Application No. 10-2011-0121062 and its English summary provided by the clients.

* cited by examiner

*Primary Examiner* — Hezron E Williams
*Assistant Examiner* — Mark A Shabman
(74) *Attorney, Agent, or Firm* — NSIP Law

(57) ABSTRACT

Disclosed herein is an inertial sensor. An inertial sensor according to preferred embodiments of the present invention is configured to include a membrane, a plurality of first electrodes patterned on the membrane, a plurality of piezoelectric elements patterned on the first electrodes, and a second electrode integrally formed to cover the piezoelectric elements. By the configuration, the piezoelectric element is encapsulated with the second electrode that is integrally formed to prevent water or humidity from being permeated into the piezoelectric element, thereby preventing physical properties of the piezoelectric element from being changed or preventing the piezoelectric element from being delaminated.

14 Claims, 2 Drawing Sheets

INERTIAL SENSOR

CROSS REFERENCE TO RELATED APPLICATION

This application claims the benefit of Korean Patent Application No. 10-2011-0121062, filed on Nov. 18, 2011, entitled "Inertial Sensor", which is hereby incorporated by reference in its entirety into this application.

BACKGROUND OF THE INVENTION

1. Technical Field

The present invention relates to an inertial sensor.

2. Description of the Related Art

Recently, an inertial sensor has been used as various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like.

The inertial sensor generally adopts a configuration in which a mass body is adhered to an elastic substrate such as a membrane, or the like, in order to measure acceleration and angular velocity. Through the configuration, the inertial sensor may calculate the acceleration by measuring inertial force applied to the mass body and may calculate the angular velocity by measuring Coriolis force applied to the mass body.

In detail, a scheme of measuring the acceleration and the angular velocity using the inertial sensor is as follows. First, the acceleration may be calculated by Newton's law of motion "F=ma", where "F" represents inertial force applied to the mass body, "m" represents a mass of the mass body, and "a" is acceleration to be measured. Among others, the acceleration a may be obtained by sensing the inertial force F applied to the mass body and dividing the sensed inertial force F by the mass m of the mass body that is a predetermined value. Further, the angular velocity may be calculated by Coriolis force "F=2 mΩ×v", where "F" represents the Coriolis force applied to the mass body, "m" represents the mass of the mass body, "Ω" represents the angular velocity to be measured, and "v" represents the motion velocity of the mass body. Among others, since the motion velocity V of the mass body and the mass m of the mass body are values known in advance, the angular velocity Ω may be calculated by detecting the Coriolis force (F) applied to the mass body.

Meanwhile, as described in Korean Laid-Open Patent Publication No. 10-2011-0072229, the inertial sensor according to the related art includes a member bonding a mass body to a flexible membrane such as a diaphragm, or the like, and piezoelectric elements and upper/lower electrodes above the membrane so as to drive the mass body or sense a displacement of the mass body. However, in the inertial sensor according to a prior art, the upper electrode formed on the piezoelectric element is patterned and thus, the piezoelectric element is not encapsulated. Therefore, water or humidity may be permeated into the piezoelectric element. As a result, if water or humidity is permeated into the piezoelectric element, physical properties may be changed or the piezoelectric element may be delaminated. Further, the non-encapsulated piezoelectric element may be damaged during a wet process or a dicing process in the manufacturing process of the inertial sensor.

SUMMARY OF THE INVENTION

The present invention has been made in an effort to provide an inertial sensor capable of preventing water or humidity from being permeated into a piezoelectric element by encapsulating the piezoelectric element with a second electrode that is integrally formed.

According to a preferred embodiment of the present invention, there is provided an inertial sensor, including: a membrane; a plurality of first electrodes patterned on the membrane; a plurality of piezoelectric elements patterned on the first electrodes; and a second electrode integrally formed to cover the piezoelectric elements.

The inertial sensor may further include insulators formed between adjacent piezoelectric elements among the patterned piezoelectric elements, wherein the second electrode is formed to cover the piezoelectric elements and the insulator.

The inertial sensor may further include sub-insulators formed at the outer surface of the piezoelectric element formed at the outside among the patterned piezoelectric elements, wherein the second electrode is formed to cover the piezoelectric elements and the sub-insulator.

The piezoelectric element and the first electrode may be patterned to correspond to each other.

The piezoelectric element may be made of lead zirconate titanate (PZT), barium titanate ($BaTiO_3$), lead titanate ($PbTiO_3$), lithium niobate ($LiNbO_3$), or quartz ($SiO_2$).

The piezoelectric elements may be patterned by etching.

A transverse sectional area of the piezoelectric element may be expanded toward the membrane.

The inertial sensor may further include: a mass body formed on a bottom portion of a central portion of the membrane; and a post formed on a bottom portion of an edge of the membrane.

The inertial sensor may further include: an insulating layer formed between the membrane and the first electrode.

The insulating layer may be made of silicon oxide ($SiO_2$).

According to a preferred embodiment of the present invention, there is provided an inertial sensor, including: a membrane; a plurality of first electrodes patterned on the membrane; a piezoelectric element integrally formed on the first electrodes; and a second electrode integrally formed to cover the piezoelectric element.

The inertial sensor may further include: sub-insulators formed at an outer surface of the piezoelectric element, wherein the second electrode is formed to cover the piezoelectric element and the sub-insulator.

The piezoelectric element may be made of lead zirconate titanate (PZT), barium titanate ($BaTiO_3$), lead titanate ($PbTiO_3$), lithium niobate ($LiNbO_3$), or quartz ($SiO_2$).

The inertial sensor may further include: a mass body formed on a bottom portion of a central portion of the membrane; and a post formed on a bottom portion of an edge of the membrane.

The inertial sensor may further include: an insulating layer formed between the membrane and the first electrode.

The insulating layer may be made of silicon oxide ($SiO_2$).

DESCRIPTION OF THE PREFERRED EMBODIMENTS

Figure 1:
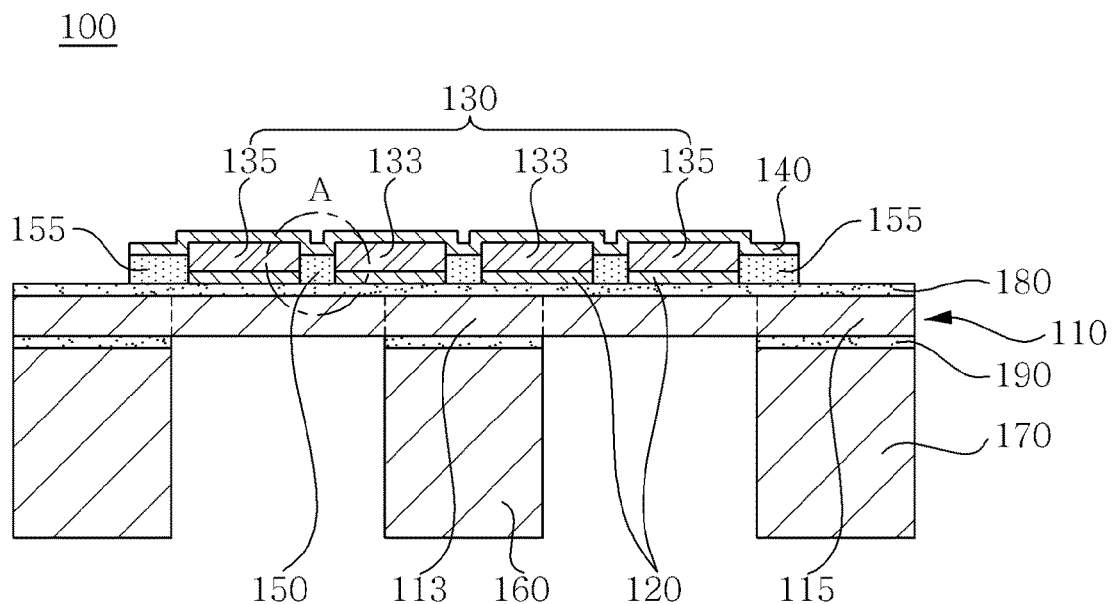
FIG. 1 is a cross-sectional view of an inertial sensor according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first," "second," and so on are used to distinguish one element from another element, and the elements are not defined by the above terms. Further, in describing the present invention, a detailed description of related known functions or configurations will be omitted so as not to obscure the subject of the present invention.

Hereinafter, preferred embodiments of the present invention will be described in detail with reference to the accompanying drawings.

FIG. 1 is a cross-sectional view of an inertial sensor according to a second preferred embodiment of the present invention.

As shown in FIG. 1, an inertial sensor 100 according to a preferred embodiment of the present invention is configured to include a membrane 110, a plurality of first electrodes 120 patterned on the membrane 110, a plurality of piezoelectric elements 130 patterned on the first electrodes 120, and a second electrode 140 integrally formed to cover the piezoelectric elements 130.

The membrane 110 is formed in a plate shape and has elasticity so as to displace the mass body 160. In this configuration, a boundary of the membrane 110 is not accurately identified. As shown, the membrane 110 may be partitioned into a central portion 113 of the membrane 110 and an edge 115 disposed along an outside of the membrane 110. In this case, the bottom portion of the central portion 113 of the membrane 110 is provided with the mass body 160 and the bottom portion of the edge 115 of the membrane 110 is provided with a post 170. Therefore, the edge 115 of the membrane 110 is fixedly supported to the post 170 and the central portion 113 of the membrane 110 based on the edge 115 of the fixed membrane 110 is displaced corresponding to the movement of the mass body 160.

Describing in more detail the mass body 160 and the post 170, the mass body 160 is disposed under the central portion 113 of the membrane 110 and is displaced by inertial force or Coriolis force. In addition, the post 170 is formed in a hollow shape to support the bottom portion of the edge 115 of the membrane 110, such that the post 170 serves to secure a space in which the mass body 160 may be displaced. In this case, the mass body 160 may be formed in, for example, a cylindrical shape and the post 170 may be formed in a square pillar in which a cavity of a cylindrical shape is formed in at a center thereof. That is, when being viewed from a transverse section, the mass body 160 is formed in a circular shape and the post 170 is formed in a square shape having a circular opening disposed at the center thereof. However, the shape of the mass body 160 and the post 170 is not limited thereto and thus, the mass body 160 and the post 170 may be formed in all the shapes that are known to those skilled in the art. Meanwhile, the above-mentioned membrane 110, the mass body 160, and the post 170 may be formed by selectively etching the silicon substrate such as a silicon on insulator (SOI) substrate, or the like.

In addition, since the mass body 160 is bonded to the central portion 113 of the membrane 110 and the post 170 is bonded to the edge 115 of the membrane 110, an adhesive layer 190 may be disposed between the mass body 160 and the central portion 113 of the membrane 110 and between the post 170 and the edge 115 of the membrane 110.

The first electrode 120, the piezoelectric element 130, and the second electrode 140 serve to drive the mass body 160 or sense the displacement of the mass body 160. The first electrode 120, the piezoelectric 130, and the second electrode 140 are sequentially formed from the membrane 110. In detail, when voltage is applied to the piezoelectric element 130 through the first electrode 120 and the second electrode 140, an inverse piezoelectric effect that expands and contracts the piezoelectric element 130 is generated. The mass body 160 formed on the bottom portion of the membrane 110 may be driven using the inverse piezoelectric effect. On the other hand, when stress is applied to the piezoelectric element 130, a piezoelectric effect that generates a potential difference between the first electrode 120 and the second electrode 140 is generated. The displacement of the mass body 160 disposed on the bottom portion of the membrane 110 may be sensed by using the piezoelectric effect. In order to use the inverse piezoelectric effect and the piezoelectric effect of the piezoelectric effect 130 for each region, the first electrode 120 and the piezoelectric element 130 are patterned in plural. For example, the first electrode 120 and the piezoelectric element 130 may be patterned in four so as to correspond to one another as shown. Among those, two piezoelectric elements 133 formed in the inside the piezoelectric element 130 may be a sensing unit that senses the displacement of the mass body 160 (using the piezoelectric effect). In addition, two piezoelectric elements 135 formed at the outside of the piezoelectric element 130 may be a driving unit that drives the mass body 160 (using the inverse piezoelectric effect). However, the patterned first electrode 120, the number of piezoelectric elements 130, and the position of the sensing unit and the driving unit are not limited to the above-mentioned configuration and therefore, may be variously changed. In particular, when the inertial sensor 100 is used as an acceleration sensor, there is no need to drive the mass body 160 and therefore, the driving unit may be omitted.

Meanwhile, unlike the first electrode 120 and the piezoelectric element 130, the second electrode 140 is integrally formed without being patterned to cover the piezoelectric element 130. As described above, the second electrode 140 is integrally formed to cover the piezoelectric element 130, thereby completely encapsulating the piezoelectric element 130 from the outside. Therefore, it is possible to prevent the physical properties of the piezoelectric element 130 from being changed or prevent the piezoelectric element 130 from being delaminated by preventing water or humidity from being permeated into the piezoelectric element 130. In addition, it is possible to prevent the piezoelectric element 130 from being damaged during the wet process or the dicing process, or the like, in the manufacturing process of the inertial sensor 100.

Figure 2:
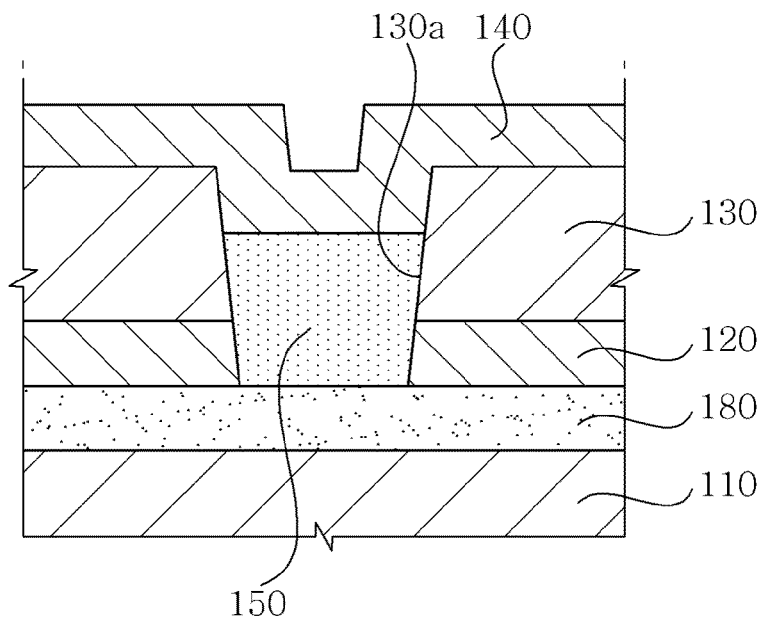
FIG. 2 is an enlarged view of part A shown in FIG. 1.

In particular, the piezoelectric element 130 may be patterned by etching. When the piezoelectric element 130 is patterned by etching, as shown in FIG. 2, a transverse sectional area of the piezoelectric element 130 is expanded toward the membrane 110. That is, a side 130a of the piezoelectric element 130 is obliquely formed and therefore, the actual exposed surface of the piezoelectric element 130 may be more expanded than being expected in a design. As described above, if the actual exposed surface of the piezoelectric element 130 is expanded, it is easier to permeate water or humidity into the piezoelectric element 130. Therefore, a need to cover and encapsulate the piezoelectric element 130 with the second electrode 140 is further increased.

Meanwhile, the second electrode 140 and the first electrode 120 are conducted through the gap between the patterned piezoelectric elements 130 or so as to prevent the conduction between the adjacent first electrodes 120, insulators 150 may be formed between the adjacent two piezoelectric elements 130 among the patterned piezoelectric elements 130. In this configuration, the second electrode 140 is formed to cover the piezoelectric element 130 and the insulator 150. In addition, sub-insulator or second insulator 155 may be formed at the outside of the piezoelectric element 130 that is formed at the outside of the patterned piezoelectric element 130. In this case, the second electrode 140 is formed to cover the piezoelectric element 130 and the sub-insulator 155 or second insulator, thereby more effectively encapsulating the piezoelectric element 130.

In addition, the aforementioned piezoelectric element 130, first electrode 120, and second electrode 140 may be formed by being deposed with, for example, sputter. Here, the piezoelectric element 130 may be made of all piezoelectric materials known in the art such as lead zirconate titanate (PZT), barium titanate ($BaTiO_3$), lead titanate ($PbTiO_3$), lithium niobate ($LiNbO_3$), quartz ($SiO_2$), or the like. Further, the first electrode 120 and the second electrode 140 may be made of conductive material, or the like, titanium (Ti), platinum (Pt), gold (Au), or the like.

Meanwhile, an insulating layer 180 may be formed between the membrane 110 and the first electrode 120. In this case, the insulating layer 180, which serves to insulate the membrane 110 and the first electrode 120, may be made of silicon oxide ($SiO_2$). The silicon oxide may be formed by selectively etching the SOI substrate and injecting oxygen $O_2$ or vapor $H_2O$ into the SOI substrate and applying heat thereto before forming the membrane 110, the mass body 160, and the post 170.

Figure 3:
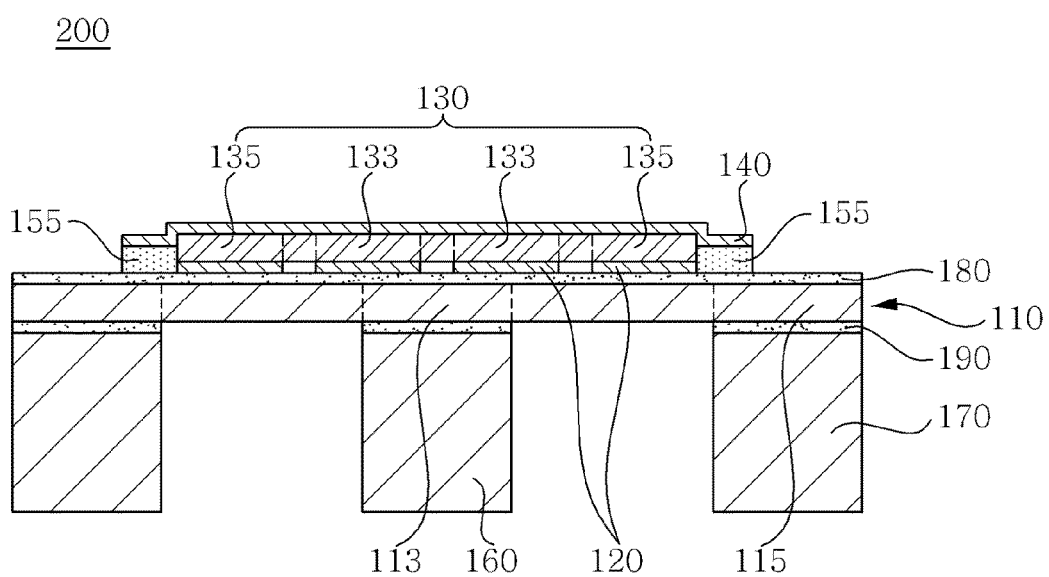
FIG. 3 is a cross-sectional view of an inertial sensor according to a second preferred embodiment of the present invention.

FIG. 3 is a cross-sectional view of an inertial sensor according to a second preferred embodiment of the present invention.

As shown in FIG. 3, an inertial sensor 200 according to a preferred embodiment of the present invention is configured to include the membrane 110, the plurality of first electrodes 120 patterned on the membrane 110, the piezoelectric element 130 integrally formed on the first electrodes 120, and the second electrode 140 integrally formed to cover the piezoelectric element 130.

The inertial sensor 200 according to the preferred embodiment of the present invention has a difference in that the piezoelectric element 130 is integrally formed without being patterned, comparing with the inertial sensor 100 according to the aforementioned first preferred embodiment. Therefore, the second preferred embodiment of the present invention briefly describes the repeated contents with the first preferred embodiment of the present invention and mainly describes the piezoelectric element 130 that is integrally formed.

The membrane 110 is formed in a plate shape and has elasticity so as to displace the mass body 160. In this case, the bottom portion of the central portion 113 of the membrane 110 is provided with the mass body 160 and the bottom portion of the edge 115 of the membrane 110 is provided with a post 170. In addition an adhesive layer 190 may be provided between the mass body 160 and the central portion of the membrane 110 and between the post 170 and the edge 115 of the membrane 110.

The first electrode 120, the piezoelectric element 130, and the second electrode 140 serve to drive the mass body 160 or sense the displacement of the mass body 160. The first electrode 120, the piezoelectric 130, and the second electrode 140 are sequentially formed from the membrane 110. Here, the piezoelectric element 130 may be formed of all piezoelectric materials known in the art such as lead zirconate titanate (PZT), barium titanate ($BaTiO_3$), lead titanate ($PbTiO_3$), lithium niobate ($LiNbO_3$), quartz ($SiO_2$), or the like. Further, the first electrode 120 and the second electrode 140 may be made of conductive material, or the like, titanium (Ti), platinum (Pt), gold (Au), or the like.

Meanwhile, in order to use the inverse piezoelectric effect and the piezoelectric effect of the piezoelectric element 130, the plurality of first electrodes 120 are patterned. For example, the first electrode 120 may be patterned in four as shown. Among those, the piezoelectric elements 133 formed on the top portions of two first electrodes 120 formed in the inside of the piezoelectric element 130 may be the sensing unit that senses the displacement of the mass body 160 (using the piezoelectric effect). In addition, the piezoelectric elements 135 formed on the top portion of the two first electrode 120 formed at the outside of the piezoelectric element 130 may be the driving unit that drives the mass body 160 (using the inverse piezoelectric effect). However, although the sensing unit and the driving unit are shown to accurately correspond to the first electrodes 130 in the drawing, the sensing unit and the driving unit are not accurately partitioned based on the first electrodes 130. In addition, the number of patterned first electrodes 120 and the positions of the sensing unit and the driving unit are not limited to the aforementioned configuration and therefore, may be variously changed. In particular, when the inertial sensor 200 is used as an acceleration sensor, there is no need to drive the mass body 160 and therefore, the driving unit may be omitted.

Meanwhile, unlike the first electrode 120, the second electrode 140 is integrally formed without being patterned to cover the piezoelectric element 130. As described above, the second electrode 140 is integrally formed to cover the piezoelectric element 130, thereby completely encapsulating the piezoelectric element 130 from the outside. Therefore, it is possible to prevent the physical properties of the piezoelectric element 130 from being changed or prevent the piezoelectric element 130 from being delaminated by preventing water or humidity from being permeated into the piezoelectric element 130. In addition, it is possible to prevent the piezoelectric element 130 from being damaged during the wet process or the dicing process in the manufacturing process of the inertial sensor 200.

In addition, the sub-insulators or second insulators 155 may be formed at the outside of the piezoelectric element 130 In this case, the second electrode 140 is formed to cover the piezoelectric element 130 and the sub-insulator or second insulator 155, thereby more effectively encapsulating the piezoelectric element 130.

Meanwhile, the insulating layer 180 may be formed between the membrane 110 and the first electrode 120 to insulate the membrane 110 and the first electrode 120. In this case, the insulating layer 180 may be made of silicon oxide ($SiO_2$).

As set forth above, the preferred embodiments of the present invention can prevent water or humidity from being permeated into the piezoelectric element by encapsulating the piezoelectric element with the second electrode that is integrally formed, thereby preventing the physical properties of the piezoelectric element from being changed or prevent the piezoelectric element from being delaminated.

In addition, the preferred embodiments of the present invention can prevent the piezoelectric element from being damaged during the wet process or the dicing process in the manufacturing process of the inertial sensor by encapsulating the piezoelectric element with the second electrode that is integrally formed.

Although the embodiment of the present invention has been disclosed for illustrative purposes, it will be appreciated that an inertial sensor according to the invention is not limited thereto, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. An inertial sensor, comprising:
   a membrane;
   a plurality of first electrodes patterned on the membrane;
   a plurality of piezoelectric elements patterned on the first electrodes;
   a second electrode integrally formed to cover the piezoelectric elements; and
   second insulators formed at the outer surface of the piezoelectric element formed at the outside among the patterned piezoelectric elements,
   wherein the second electrode is formed to cover the piezoelectric elements and the second insulators.

2. The inertial sensor as set forth in claim 1, further comprising:
   insulators formed between adjacent piezoelectric elements among the patterned piezoelectric elements;
   wherein the second electrode is formed to cover the piezoelectric elements and the insulator.

3. The inertial sensor as set forth in claim 1, wherein the piezoelectric element and the first electrode are patterned to be identical to each other.

4. The inertial sensor as set forth in claim 1, wherein the piezoelectric elements are made of lead zirconate titanate (PZT), barium titanate ($BaTiO_3$), lead titanate ($PbTiO_3$), lithium niobate ($LiNbO_3$), or quartz ($SiO_2$).

5. The inertial sensor as set forth in claim 1, wherein the piezoelectric elements is patterned by etching.

6. The inertial sensor as set forth in claim 5, wherein a transverse sectional area of the piezoelectric element is expanded toward the membrane.

7. The inertial sensor as set forth in claim 1, further comprising:
   a mass body formed on a bottom portion of a central portion of the membrane; and
   a post formed on a bottom portion of an edge of the membrane.

8. The inertial sensor as set forth in claim 1, further comprising:
   an insulating layer formed between the membrane and the first electrode.

9. The inertial sensor as set forth in claim 8, wherein the insulating layer is made of silicon oxide ($SiO_2$).

10. An inertial sensor, comprising:
    a membrane;
    a plurality of first electrodes patterned on the membrane;
    a piezoelectric element integrally formed on the first electrodes;
    a second electrode integrally formed to cover the piezoelectric element; and
    second insulators formed at the outside of the patterned piezoelectric element,
    wherein the second electrode is formed to cover the piezoelectric elements and the second insulator.

11. The inertial sensor as set forth in claim 10, wherein the piezoelectric element is made of lead zirconate titanate (PZT), barium titanate ($BaTiO_3$), lead titanate ($PbTiO_3$), lithium niobate ($LiNbO_3$), or quartz ($SiO_2$).

12. The inertial sensor as set forth in claim 10, further comprising:
    a mass body formed on a bottom portion of a central portion of the membrane; and
    a post formed on a bottom portion of an edge of the membrane.

13. The inertial sensor as set forth in claim 10, further comprising:
    an insulating layer formed between the membrane and the first electrode.

14. The inertial sensor as set forth in claim 13, wherein the insulating layer is made of silicon oxide ($SiO_2$).

* * * * *